United States Patent [19]

Franke et al.

[11] 4,039,248
[45] Aug. 2, 1977

[54] SHEATHED FIBER LIGHT CONDUCTOR

[75] Inventors: Hermann Franke, Korschenbroich-Pesch; Willi Kückes, Wegberg; Wolfgang Märtin, Monchen-Gladbach, all of Germany

[73] Assignee: AEG-Telefunken Kabelwerke AG Rheydt, Monchen-Gladbach, Germany

[21] Appl. No.: 614,952

[22] Filed: Sept. 19, 1975

[30] Foreign Application Priority Data

Sept. 20, 1974 Germany .......................... 2445532

[51] Int. Cl.² ............................ G02B 5/14; G02B 5/16
[52] U.S. Cl. ............................ 350/96 B; 350/96 WG
[58] Field of Search ............. 350/96 R, 96 B, 96 WG; 174/69, 28, 29

[56] References Cited

U.S. PATENT DOCUMENTS

| 2,636,923 | 4/1953 | Perzel | 174/28 |
| 3,699,950 | 10/1972 | Humphrey, Jr. et al. | 350/96 B |

Primary Examiner—John K. Corbin
Assistant Examiner—Stewart Levy
Attorney, Agent, or Firm—Spencer & Kaye

[57] ABSTRACT

A fiber light conductor housed in a hollow tubular sheath with the conductor being given an undulating configuration in order to minimize the adverse influence thereon of mechanical stresses and external forces.

16 Claims, 11 Drawing Figures

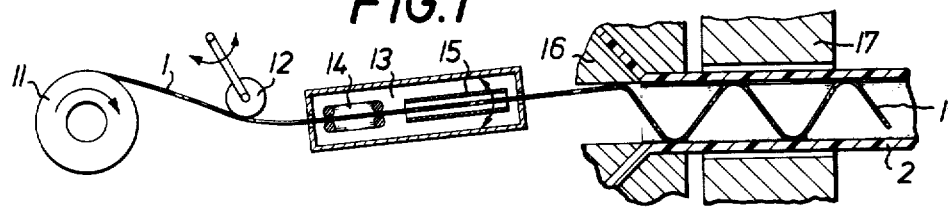
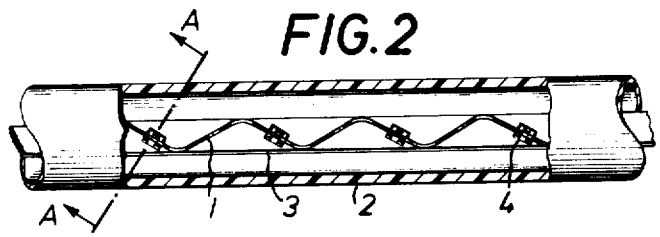
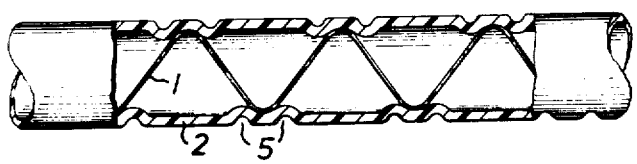
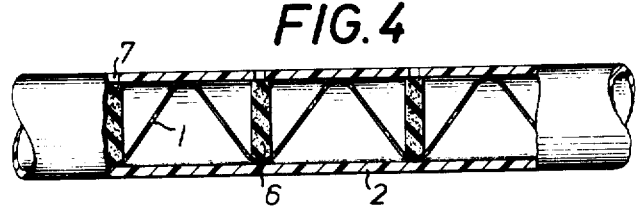
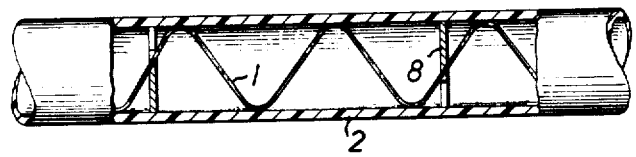
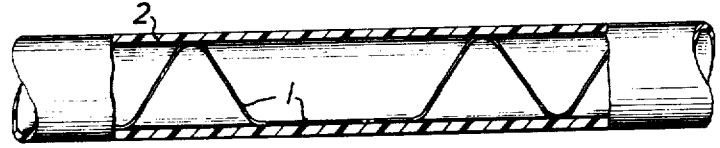

SHEATHED FIBER LIGHT CONDUCTOR

BACKGROUND OF THE INVENTION

The present invention relates to light conductors, particularly of the type constituted by optical fibers housed in a tubular sheath.

The use of light conductors in place of or in addition to electrical conductors for transmission of information signals has been known in theory for some time and has resulted in the use of, preferably, glass fibers or glass filaments, but in any case long, thin, flexible, artificially produced structures of glass, as light conductors in addition to other solid and liquid substances. The advances in the art of low-loss glasses and quartzes has further resulted in the development of limited length light conductors for endoscopes and transmission and amplification devices, for example, as well as light conductors of effectively unlimited length, for example in the form of cables known as light cables or light conducting cables.

There exist, in addition to bare cables, sheathed light conductors in which an individual, cylindrical, light transmitting, dielectric body or a bundle of such bodies is embedded in a sheathing medium having an optical index of refraction different from that of the bodies. The performance of these sheathed light conductors is aided by the total reflection which will occur at the boundary between the materials having different refractive indices for certain values of the ratio between those indices.

Furthermore, a distinction is made between single mode and plural mode light conductors.

It has also been known for a long time to enclose glass fiber light conductors individually or as a group in an outer flexible protective covering which is independent of the configuration of the conductors themselves, or to at least fasten conductors on an additional, preferably band-shaped, carrier or between two such carriers, in particular to glue them thereto. Both methods are intended to prevent mechanical damage to the glass fiber light conductors which are known to have a high tensile strength but insufficient shear resistance. Thermoplastic synthetics such as polyethylene, polyesters, polyamides or polyacrylates have been considered as sheathing materials as well as for the carrier tapes. In addition it is also known to use woven hoses, which are lacquered or resin-saturated and then hardened, for the sheathings.

In addition to tightly wrapping the outer, often multi-layer, protective sheathing around the glass fiber light conductor or conductors, it is also known to use sheathings which leave cavities around the conductors, particularly sheathings which are provided with internal, e.g. cam-like, protrusions which act as spacers or to use sheaths with a smooth interior in which one or a plurality of turns of threads, or filaments, are wound to provide a spacing between the glass fiber light conductor and the protective sheathing.

Another known cavity sheathing construction involves a continuous covering of a glass fiber light conductor with a cellular polyethylene layer extruded around the conductor and the disposition of a plurality of glass fiber ligh conductors between the arms of a star-profile central plastic core which is encased in an outer plastic coating, the arrangement being such that cavities are provided therein.

In all these numerous known embodiments, the glass fiber light conductors are arranged to be as straight as possible and are stretched out inside their protective sheathing and/or in their additional carriers. These arrangements are obviously based on the endeavor to avoid bends in the glass fiber light conductors of a light conducting cable as much as possible in order to reduce transmission attenuation, although it is known, on the other hand, that curvatures exceeding a certain radii of curvature of the order of magnitude of centimeters have no influence on the light conduction at the light wavelengths employed for transmission.

SUMMARY OF THE INVENTION

Against the background of this state of the art, the present invention has as its object to eliminate certain drawbacks inherent in known fiber light conductor structures, in particular those employing glass fiber light conductors.

A more specific object of the invention is to provide fiber light conductors which remain, during manufacture, installation and operation in light conducting cables, substantially free of mechanical stresses and are protected against external forces.

These and other objects are achieved according to the invention by disposing the fiber light conductor inside a hollow, tubular protective sheath provided with substantially uniform corrugations which contact the walls of the tube at intervals, the corrugations forming waves of such a length that the transmission losses as a result of the corrugations are negligibly small compared to the attenuation losses attributable to the fibers themselves.

The fiber light conductor is thus according to the invention no longer arranged in its sheath, in the manner previously generally considered desirable, in a long, stretched-out configuration but lies in turns which form, for example, sine waves within the cavity enclosed by the tubular sheath. With a corrugation which is located in only one plane, only the wave peaks of the path defined by the fiber light conductor contact the inner wall of the tubular sheath. It is also possible, however, to cause the waves of the fiber light conductor path to lie in several planes and to make only periodically regular corrugations. Thus wave-free sections or sections with waves in a different plane may lie between the corrugated sections.

The lower limit of the wavelengths, or macrobends, or in other words of the radii of curvature of the corrugations of the fiber light conductor according to the invention, above which the losses remain negligibly small compared to other losses attributable to the fibers themselves, i.e. losses due to microbends, inhomogeneities or material properties can be derived from the information presented in two published papers by Dietrich Marcuse in which he discusses the theory of transmission losses resulting from bends in a fiber light conductor. These publications are: Chapter 9.6, particularly page 406, of the text LIGHT TRANSMISSION OPTICS, Van Norstrand Reinhold Company, New York (1972), and the article *Bent Optical Waveguide With Lossy Jacket,* The Bell System Technical Journal, Volume 53, No. 6, 1974, at pages 1079 et seq.

In these papers the attempt has been made to calculate the magnitude of the transmission losses as a result of bends in a fiber light conductor utilizing the values R for the radius of curvature of such bend, d for the fiber core radius, or one-half the width of a stripline, and D for the inner radius of the fiber jacket, as well as the relationship $R/d$ or the reciprocal $d/R$. However, no conclusions are presented which indicate that with an intentional continuous corrugation it is possible to solve the problem of avoiding deformations or twists in the fiber light conductor which are a result of mechanical stresses and which adversely influence the transmission quality.

The mathematical calculation or recalculation based on Marcuse's works shows that the transmission losses as a result of the curvatures will remain negligibly small compared to the attenuation losses due to the fibers themselves if the relationship between fiber jacket radius D and fiber core radius $d$, is such that the ratio $(D-d)/d$ is equal to or, preferably, greater than 3, i.e. as great as possible, and if the ratio between fiber core radius $d$ and radius of curvature R, i.e. $d/R$, is equal to or, preferably, less than $10^{-3}$, i.e. as small as possible.

A few numerical examples will further explain these relationships. For commercially available fibers having a core radius $d$ of between 10 and 15$\mu$ and for an inner jacket radius D of between 60 and 100$\mu$, the relationship $(D-d)/d$ yields values of between 3 and 9. If, on the other hand, the fiber core radius $d$ is 10$\mu$, the radius of curvature R must be greater than 10mm in order for the relationship $d/R$ to be less than $10^{-3}$. This means that the wavelength of the corrugation provided by the present invention may have the order of magnitude of centimeters in view of the small dimensions which can be given to fiber light conductors.

In general, it applies that the transmission losses shift toward smaller and smaller values with increasing $(D-d)/d$ and constant $d/R$. Transmission losses as a result of refraction for the values given above lie substantially below 1 dB/km. Under consideration of the realizable value for the refractive index, it is possible to produce useful light conducting cables with total losses in the area between 2 and 3 dB/km, compared to which the transmission losses as a result of the corrugation are indeed negligibly small because they lie substantially below 1 dB/km.

According to a preferred embodiment of the present invention, the fiber light conductors are additionally fixed in their corrugated form either continuously or at intervals in the hollow tubular sheath. With continuous fixing the fiber light conductors may be fastened, for example, as mentioned above to known tape-shaped carriers whose width corresponds approximately to the inner diameter of the tube. Fixing of the corrugated fiber light conductor at intervals may be effected, for example, by means of protrusions, humps or the like which are shaped or pressed in a known manner into the sheathing tube, as mentioned above, or by means of foamed bodies of defined length which are inserted through holes in the sheathing tube, or by means of narrow slotted discs.

The technical advance realized by the present invention in the manufacture, installation and operation of light conducting cables is mainly that, due to their corrugated configuration, the fiber light conductors are able to yield in an elastically resilient manner due to mechanical stresses occurring therein or external forces without lying loosely in the sheath, which would make them subject to vibration. The increase in the total length of the fiber light conductors, which is a result of the selected corrugated shape, is no drawback in view of the resulting minimum transmission attenuation and does not counteract the resulting advantage of greater dependability. This also applies for the apparatus required to produce the corrugations.

A further advance results from the present invention when any desired number of corrugated fiber light conductors are combined in a known manner to produce light conducting cables, when they are twisted into pairs, groups of four, bundles or layers, even together with known electrical transmission and supply lines and their common outer sheathing and reinforcement.

The corrugated fiber light conductors according to the present invention are able to yield in their protective sheaths to all stresses, particularly when being further processed into cables, without suffering any damage and most of all without being exposed to the danger of breaking.

BRIEF DESCRIPTION OF THE DRAWING

FIG. 1 is a simplified cross-sectional view of apparatus for the corrugated placement of a fiber light conductor in a protective sheath according to the invention.

FIG. 2 is a cross-sectional view of a corrugated fiber light conductor according to the invention fastened to a carrier tape, there being shown two conductor portions bent at equal angles to one another.

FIG. 3 is a view similar to that of FIG. 2 of a corrugated fiber light conductor fastened, according to the invention, at intervals by means of pairs protrusions which are pressed inwardly in the protective sheath.

FIG. 4 is a view similar to that of FIG. 2 of a corrugated fiber light conductor fastened, according to the invention, at intervals by means of foamed bodies introduced through holes in the protective cover.

FIG. 5 is a view similar to that of FIG. 2 of a corrugated conductor fastened, according to the invention, by means of slotted narrow discs which are placed at intervals onto the corrugated fiber light conductor.

FIG. 5a is a detail, cross-sectional view of one of the discs of FIG. 5, the view being in the direction of the axis of the sheath of FIG. 5.

FIG. 6 is a view similar to that of FIG. 2 of a corrugated conductor showing wave-free sections lying between corrugated sections.

FIG. 1a is a cross-sectional view of a fiber light conductor in a protective sheath, showing the fiber light conductor path lying in a single plane, the view being in the direction of the axis of the sheath of FIG. 1.

FIG. 1b is a cross-sectional view of a fiber light conductor in a protective sheath showing the fiber light conductor path lying in several planes, the view being in the direction of the axis of the sheath similar to that of FIG. 1.

FIG. 2a is a cross-sectional view taken on line A—A of FIG. 2.

FIG. 2b is a cross-sectional view taken on line A—A of FIG. 2 showing the fiber light conductor being fastened by U-shaped bars instead of cut-out tongues.

DESCRIPTION OF THE PREFERRED EMBODIMENTS

FIGS. 1-5 all illustrate a light conductor composed of corrugated fiber light conductors 1 disposed within a hollow, tubular protective sheath 2 which may be made, for example, of polyethylene or some other thermoplastic material. In FIG. 1 the end portion of the apparatus for winding up the end of the finished conductor, which is designed in a known manner and operates continuously, is not shown.

In the operation of the apparatus depicted in FIG. 1, the as yet uncorrugated, prefabricated fiber light conductor 1 is withdrawn from a supply reel 11 and passes around a tension controller 12 to an installing device 13 which is mounted and driven to pivot up and down about a fulcrum located in the vicinity of the axis of the sheath 2. Device 13 includes a worm-type withdrawal device 14 and a guide tube 15. In place of the worm-type withdrawal device it is possible to use some other, e.g. nonpivotal gear or disc, withdrawal device and to cyclically pivot only guide tube 15.

By means of the withdrawal device and the pivoting movement, the fiber light conductor 1 is introduced in a corrugated or undulating form into the hollow sheath 2 while the latter is being produced in a known manner by means of an extruder head 16 provided with a hollow core. A vacuum suction device 17 is provided to prevent the sheath 2 from collapsing while still in its warm, deformable state.

FIG. 1a shows in a cross-sectional view taken in the direction of the axis of the sheath the corrugations of the fiber light conductor lying in only one plane.

All movements in the entire arrangement take place in synchronism. The light conductor 1 can be given a corrugated form which lies in more than one plane by imparting an additional, rotating, movement of the cyclically pivoting installation device 13 (FIG. 1b).

In FIG. 2, the fiber light conductor 1 which has been corrugated in the same or a similar manner is fastened to a prefabricated supporting plastic band 3 by means of, for example, pairs of tongues 4, or flaps, which have been cut out of the band. The tongues 4 should be disposed in the center of the band transverse to the longitudinal axis of the band and preferably parallel to the straight center portions of the conductor 1, which portions lie between successive bends in the conductor. The tongues may also be bent around the conductor or may have a sawtooth shape over their entire width or at least at their edges in order to reinforce fixing of the conductor 1 on the carrier band 3 (FIG. 2a).

Instead of cut-out tongues it is also possible to provide small U-shaped bars 4a, which also have sawtoothed edges, for example, and which are inserted in slits in the carrier band 3, for example under tension, to fix the conductor 1, as shown in FIG. 2b.

The carrier band 3 with the conductor 1 fastened thereon in its corrugated form is then inserted into the protective sheath 2, which has been produced in the same or a similar manner as described with reference to FIG. 1 in synchronism with the movement of the carrier band. It is recommended to make the carrier band 3 somewhat narrower than the inner diameter of sheath 2.

In FIG. 3 the fiber light conductor 1 which has been inserted in the same or a similar manner into the sheath 2 in its corrugated form is fixed by means of pairs of internal protrusions 5 which have been made at intervals in the walls of the sheath. These small inwardly protruding bosses rest against all of the bends, or undulation peaks, of the fiber conductor 1 or a sufficient number thereof in the manner of hump-like protrusions. Such protrusions can be produced, for example, by means of one or a plurality of printing stamps which operate in synchronism with the other movements of the fabrication apparatus and which, if required, are heated. Such stamps are pressed from the outside into the just fabricated and still deformable sheath 2.

In FIG. 4 the fiber light conductor 1 is fixed in the sheath 2 by means of foam bodies 6 which are introduced into the sheath at regular intervals through holes opposite respective undulation wave peaks. The insertion is preferably effected by injection. It is also possible, however, to press resilient, prefabricated, plug-type foamed bodies through the holes.

A suitable foamed material is, for example, a polyurethane (PUR) which can be injected and then forms expanded cells which solidify so that a bend, or peak, of the undulating fiber light conductor which lies opposite the hole is fixed in its position.

The configuration of the foamed bodies 6 shown in FIG. 4 is only one example of possible variations. The number and sequence of foamed bodies along the corrugated fiber are variable. In addition, these bodies can be inserted from only one side or from several sides of the sheath 2.

The embodiment shown in FIG. 5 differs from that of FIG. 1 by the additional periodic introduction of narrow discs 8 which are provided with eccentric notches 9 and which are prefabricated, for example. They may also be made of a thermoplastic material, e.g. of a foamed material. Between each one of the successive discs 8, one or a plurality of odd-numbered half-waves of the undulating path of the fiber light conductor 1 may be disposed. The discs 8, whose slits or notches 9 are located to correspond to the path of the fiber light conductor, may also be arranged in an oblique direction and should be arranged so that the directions of the notches 9 alternate from one disc to the next. The arrangement of the discs in FIG. 5 is only one of several possible variations. Various devices for placing such discs onto wires are known in the art and any one of these devices can be employed in the assembly of the arrangement of FIG. 5.

FIG. 5a illustrates the configuration of one of the discs 8 having a slit 9 provided with an enlarged base that corresponds to the cross section of light conductor 1.

In FIG. 6 the path of the axis of said conductor 1 is only periodically regularly undulated. That means wave-free sections lying between corrugated sections.

In FIG. 1b showing a cross-sectional view similar to FIG. 1a the corrugations of the light conductor 1 lie in a plurality of planes turning round the axis of the sheath 2.

FIG. 2a shows the conductor 1 fixed on the supporting plastic band 3 between two tongues 4 in a cross-sectional view taken on line A—A of FIG. 2.

It will be understood that the above description of the present invention is susceptible to various modifications, changes and adaptations, and the same are intended to be comprehended within the meaning and range of equivalents of the appended claims.

What is claimed is:

1. In a light conducting unit for a light conducting cable, the unit including a fiber light conductor and a sheath enclosing and supporting the conductor, the improvement wherein said sheath is a hollow tubular sheath and said conductor is shaped in a manner such that its longitudinal axis follows a substantially uniform undulating path along the length of said tube and said conductor contacts the inner wall of the sheath only at spaced intervals and is out of contact with the inner wall in regions between such intervals for permitting said conductor to yield in an elastically resilient manner due to mechanical stresses.

2. A method for producing the unit defined in claim 1 comprising the steps of:
providing a fiber light conductor wound on a supply reel;
continuously withdrawing the conductor from the supply reel while controlling the tension on the conductor;

continuously forming the hollow sheath in an extruder head and conveying the sheath away therefrom;

continuously introducing the conductor into the sheath as the latter is being formed by passing the conductor through an installation device which undergoes cyclic movement transverse to the axis of the sheath in a manner to cause the conductor to follow such undulating path within the sheath.

3. An arrangement as defined in claim 1 wherein the undulating path followed by said conductor has the form of a periodically repeating wave whose wavelength is of a magnitude such that light transmission losses due to the undulating shape of said conductor are negligibly small compared with those attributable to said conductor itself.

4. An arrangement as defined in claim 1 wherein said conductor is a glass fiber light conductor.

5. An arrangement as defined in claim 1 wherein the axis of said conductor lies in a single plane parallel to the axis of said sheath.

6. An arrangement as defined in claim 1 wherein the axes of said conductor lies in a plurality of planes parallel to the axis of said sheath.

7. An arrangement as defined in claim 1 wherein the path of the axis of said conductor is only periodically regularly undulated.

8. An arrangement as defined in claim 1 wherein said conductor is held in place at least at intervals along its length.

9. An arrangement as defined in claim 8 wherein the wall of said sheath is provided with openings spaced along the length of said sheath and further comprising foamed bodies inserted into said sheath through said openings and holding said conductor in place.

10. An arrangement as defined in claim 8 further comprising a plurality of discs provided with eccentric notches and inserted into said sheath at spaced intervals along its length, said conductor being held by said discs by engaging in said notches thereof.

11. An arrangement as defined in claim 8 wherein said conductor is held in place along its entire length.

12. An arrangement as defined in claim 8 further comprising a band-shaped support member which is inserted into said sheath and to which said conductor is fastened.

13. An arrangement as defined in claim 12 wherein said support member is slit to define a plurality of fastening tongues at spaced intervals thereon and said conductor is held by said tongues.

14. An arrangement as defined in claim 12 wherein said support member is slit at intervals along its length and further comprising U-shaped bars which are inserted into the slits in said support member and holding said conductor.

15. An arrangement as defined in claim 8 wherein the inner wall of said sheath is provided with protrusions spaced along the length of said sheath and said conductor is held in place by said protrusions.

16. An arrangement as defined in claim 15 wherein said protrusions are arranged in pairs, with the protrusions of each pair being adjacent one another and being spaced apart to define a recess, and each such recess is engaged by a bend in said conductor.

* * * * *